(12) United States Patent
Burmeister

(10) Patent No.: US 9,925,893 B1
(45) Date of Patent: Mar. 27, 2018

(54) INFANT SUPPORT SEAT WITH HEAD RELIEF FOR PREVENTING CONTACT INJURIES

(76) Inventor: Sonja Burmeister, Coopersburg, PA (US)

( * ) Notice: Subject to any disclaimer, the term of this patent is extended or adjusted under 35 U.S.C. 154(b) by 1187 days.

(21) Appl. No.: 13/371,394

(22) Filed: Feb. 11, 2012

(51) Int. Cl.
*B60N 2/28* (2006.01)

(52) U.S. Cl.
CPC ........... *B60N 2/286* (2013.01); *B60N 2/2863* (2013.01)

(58) Field of Classification Search
CPC .............................. B60N 2/286; B60N 2/2863
USPC ......................................... 297/256.13, 250.1
See application file for complete search history.

(56) References Cited

U.S. PATENT DOCUMENTS

| | | | | |
|---|---|---|---|---|
| 5,344,213 A | * | 9/1994 | Koyanagi | 297/256.13 X |
| 6,659,553 B2 | * | 12/2003 | Achleitner et al. | 297/250.1 |
| 7,261,376 B2 | * | 8/2007 | Kespohl | 297/256.13 X |
| 8,141,951 B2 | * | 3/2012 | Chen | B60N 2/2821 297/256.13 X |
| 2010/0078976 A1 | * | 4/2010 | Hou et al. | 297/250.1 X |
| 2011/0127810 A1 | | 6/2011 | Lee et al. | |
| 2012/0032477 A1 | * | 2/2012 | Cymbalski et al. | 297/250.1 |

* cited by examiner

*Primary Examiner* — Anthony D Barfield
(74) *Attorney, Agent, or Firm* — LaMorte & Associates

(57) ABSTRACT

An infant seat assembly that greatly reduces the incidences of contact sores, balding and/or cranial deformations on an infant's head. The assembly includes a seating unit. A backrest is connected to the seating unit. The backrest defines a relief having an area of at least seven square inches so that it can cradle the back of an infant's head without concentrating the point of contact. The relief is positioned at a height above the seating surface that is manually adjustable. In this manner, an infant can be seated and the infant's head supported without concentrating contact forces at the center of the infant's head. The seat assembly can also be made to be a bouncer seat by interconnecting the backrest to the seating unit using torsion springs. A unique angle of inclination adjustment mechanism is provided that enables the backrest to be reclined relative the seating surface.

19 Claims, 4 Drawing Sheets

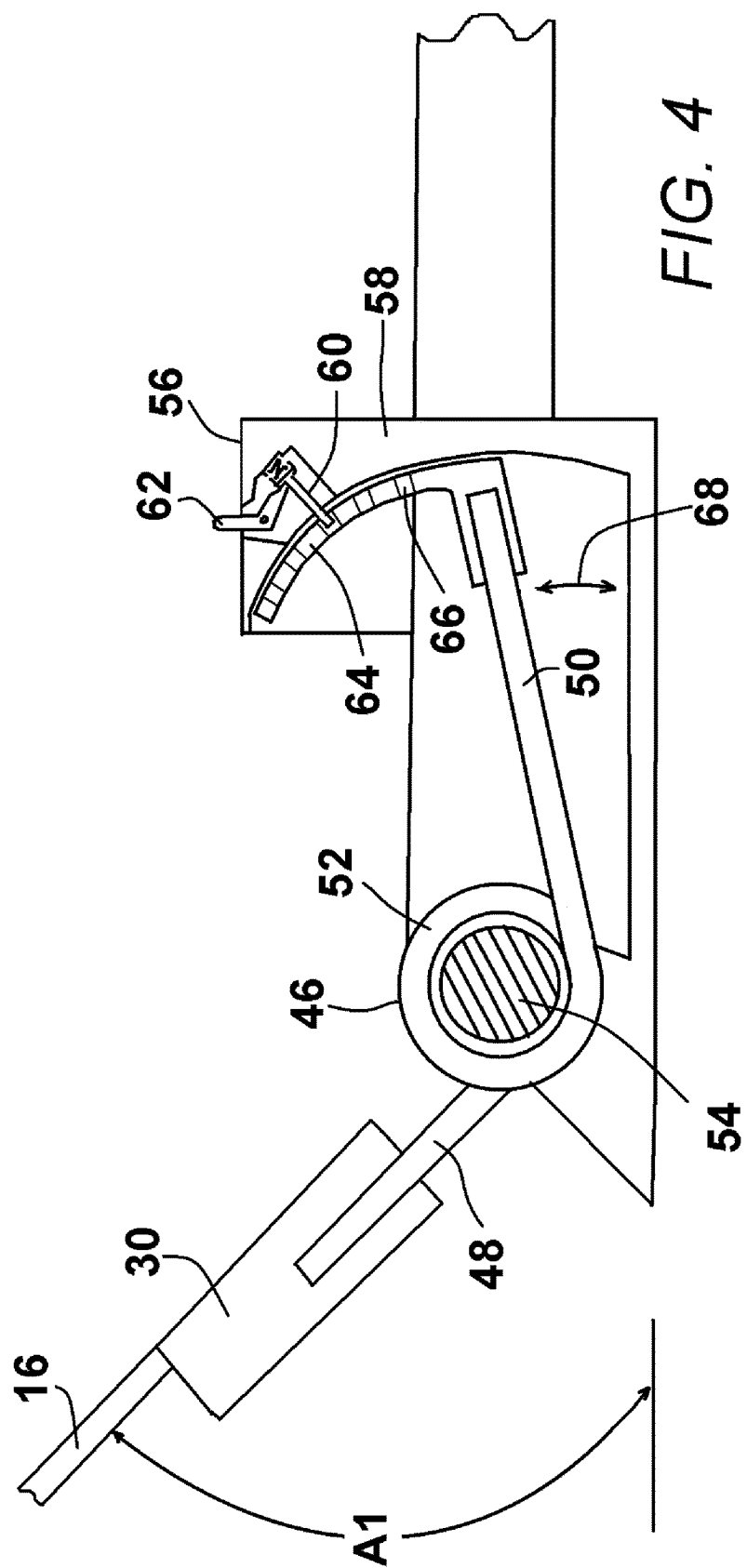

INFANT SUPPORT SEAT WITH HEAD RELIEF FOR PREVENTING CONTACT INJURIES

BACKGROUND OF THE INVENTION

1. Field of the Invention

In general, the present invention relates to chairs and seats that are designed to support infants and small children. More particularly, the present invention relates to seats with spring-loaded backrests that enable an infant to bounce while remaining seated and supported.

2. Prior Art Description

Newborn infants lack the strength to stand or even to roll over. Accordingly, newborn infants must be carried from place to place. When not being carried, the newborn child is placed in a crib, baby stroller of similar safe support.

However, within a few months of being born, infants develop enough muscle tone to turn over and otherwise move their bodies. It is typically during this stage of development that an infant is "buckled" or otherwise restrained into a seat or stroller.

Being retrained in a seat, stroller or similar structure causes some problems if done for prolonged periods of time. In extreme cases, infants can develop contact sores or even cranial deformations. However, what is much more common is an infant developing a bald spot on the back of his/her head where hair growth is inhibited by constant contact with a surface. Many baby seats and strollers are heavily padded to prevent contact problems. However, the heavy padding makes the stroller and carriers hot, especially during warm weather. As a result, heavily padded seats can be uncomfortable or even dangerous, depending upon the temperature.

A common baby seat used to hold infants that have just developed enough muscle tone to move is a "bouncer seat". A bouncer seat is a lightweight seat that has a backrest that is spring loaded. In this manner, when a baby leans back against the backrest, the backrest can yield slightly to the weight and force of the baby. This gives the seat the ability to bounce. It also helps alleviate the forces that contact the back of an infant's head as they are seated. Many different prior art bouncer seat designs are on the marketplace. Such prior art bouncer seat designs are exemplified by U.S. Patent Application Publication No. 2011/0127810 to Lee, entitled Collapsible Infant Bouncer.

Although the spring of a bouncer seat can alleviate the contact forces experienced by the back of an infant's head, contact still occurs between the infant's head and the backrest of the seat. This contact can cause aggravate injuries, cause head flattening and/or create hair loss. However, a head support must be provided since an infant lacks the muscle tone required to support his/her own head. A paradoxical problem therefore occurs where an infant's head must be supported, without the infant's head contacting a head support.

A need therefore exists for a seat that can support an infant in an upright position and provide full head support to the infant without causing contact injuries to the infant's head. This need is met by the present invention as described and claimed below.

SUMMARY OF THE INVENTION

The present invention is an infant seat assembly that greatly reduces the incidences of contact sores, balding and/or cranial deformations on an infant's head. The assembly includes a seating unit. The seating unit has a seating surface upon which an infant can sit. A backrest is connected to the seating unit. The backrest defines a relief having an area of at least seven square inches so that it can cradle the back of an infant's head without concentrating contact forces in the middle of the infant's head. The relief is positioned at a height above the seating surface that is manually adjustable. In this manner, an infant can be seated and the infant's head properly cradled by the relief. The adjustability enables this alignment to be maintained as the infant grows into a toddler.

The seat assembly provided can also be made to be a bouncer seat by interconnecting the backrest to the seating unit using torsion springs. A unique angle of inclination adjustment mechanism is provided that enables the backrest to be reclined relative the seating surface while maintaining both the ability to bounce and the proper alignment of the infant's head with the relief in the backrest.

The presence of the relief and the ability to have the backrest incline allows for optimal head and neck alignment while supporting the natural curve of the spine. This enables an infant to better, breathe, swallow and suck, thus making it easier to feed the infant.

Lateral head supports are provided on the sides of the head relief. The lateral head supports are both adjustable in position and selectively removable. When in place, the lateral supports align the infant's head with the midline of the backrest and the relief. The lateral head supports therefore keep the infant straight, thereby ensuring proper airway alignment and maximizing breathing efficiency while seated in the seat assembly.

The seat assembly comes with a removable cushioned cover. This provides cushioning and style to the seat assembly as well as providing contact surfaces that can be easily laundered. The seat assembly can also come with a tray, a toy mobile, and other auxiliary items that can be selectively added to the seat assembly if desired.

BRIEF DESCRIPTION OF THE DRAWINGS

For a better understanding of the present invention, reference is made to the following description of an exemplary embodiment thereof, considered in conjunction with the accompanying drawings, in which:

FIG. 4 is a cross-sectional view of the embodiment of FIG. 2 shown along section line 4-4 to illustrate the angle of inclination adjustment mechanism for the backrest.

DETAILED DESCRIPTION OF THE DRAWINGS

Although the present invention infant support seat can be embodied in many ways, only one exemplary embodiment is illustrated and described. The embodiment is selected in order to set forth the best mode contemplated for the invention. The illustrated embodiment, however, is merely exemplary and should not be considered a limitation when interpreting the scope of the appended claims.

Figure 1:
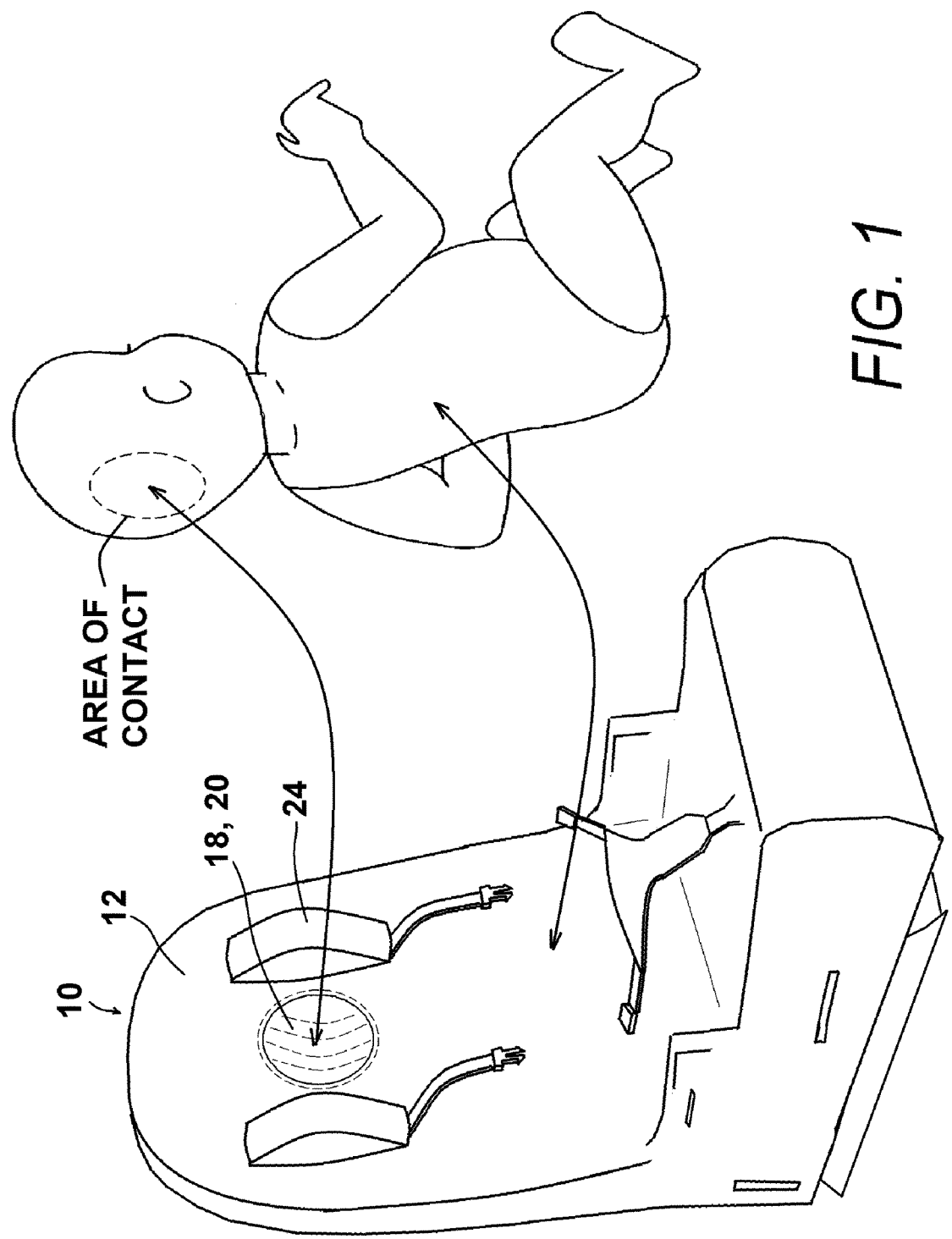
FIG. 1 is a perspective view of an exemplary embodiment of an infant seat assembly.
Figure 2:
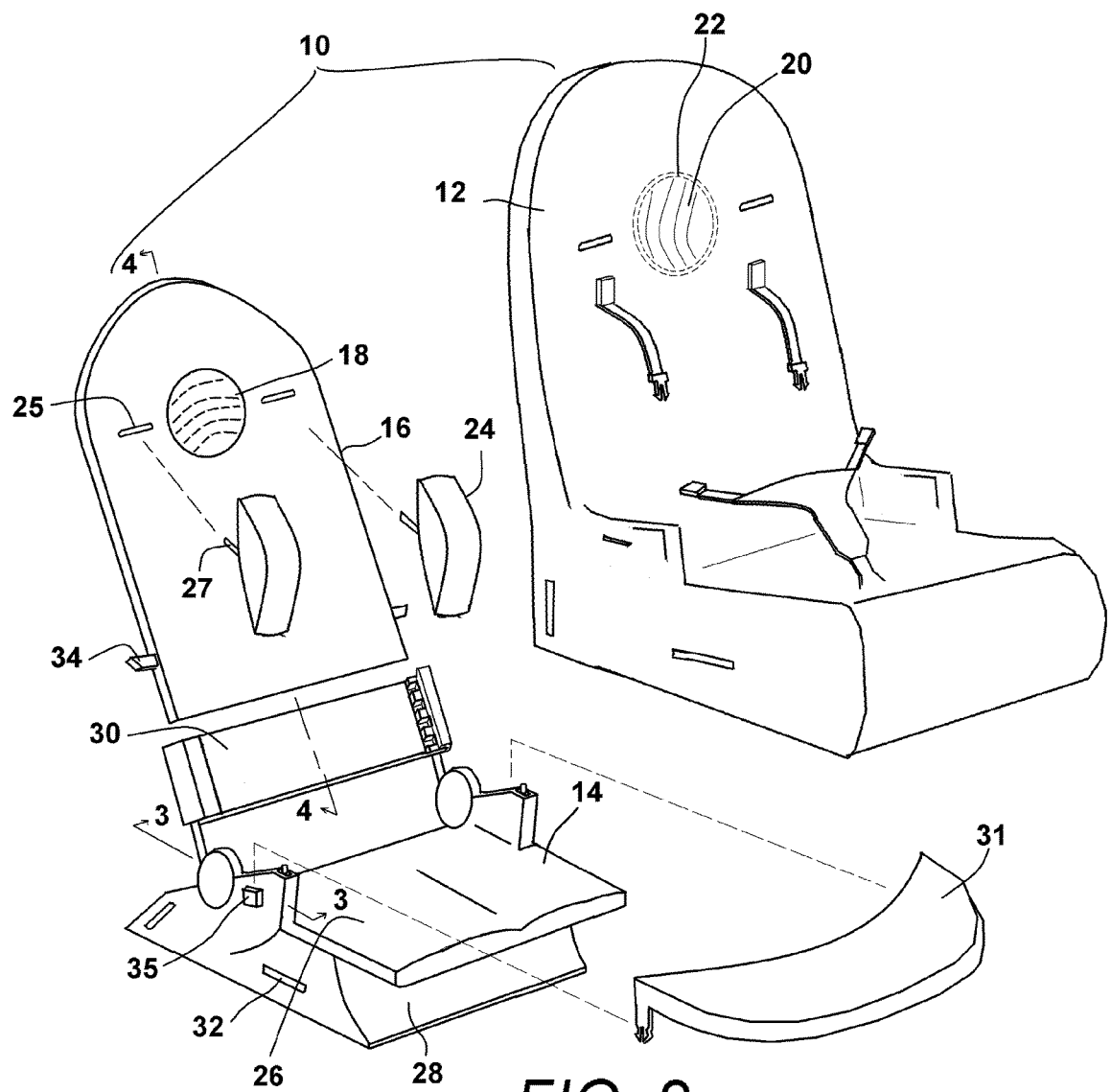
FIG. 2 is an exploded perspective view of the embodiment of FIG. 1.

Referring to both FIG. 1 and FIG. 2, the present invention infant seat assembly 10 is shown. The infant seat assembly 10 can be covered in a removable fabric cover 12. The fabric cover 12 provides padding to the infant seat assembly 10. The fabric cover 12 also can be periodically removed and laundered to maintain the cleanliness of the overall infant seat assembly 10. The fabric cover 12 also contains the various straps and supports needed to secure an infant to the infant seat assembly 10.

Under the fabric cover 12, the infant seat assembly 10 includes a seating unit 14 and a backrest 16. A relief 18 is formed in the backrest 16 in the area where an infant's head would rest when seated in the infant seat assembly 10. The relief 18 can be a complete opening that passes through the backrest 16 or a concave depression, such as is illustrated. A corresponding opening or pocket 20 is also formed into the fabric cover 12. In this manner, the fabric cover 12 conforms to the relief 18 in the backrest 16 when in place. The pocket 20 in the fabric cover 12 may have a padded rim 22. The diameter of the relief 18 in the backrest 16 and the pocket 20 in the fabric cover 12 is preferably between three and six inches. Accordingly, the area defined by the relief 18 and the aligned pocket 20 are at least seven square inches. However, the area is not so large as to allow even the smallest of infant heads to pass fully into the relief 18.

The relief 18 in the backrest 16 and the aligned pocket 20 in the fabric cover 12 receive a portion of the infant's head. The back of the infant's head partially passes into the pocket 20 and relief 18. However, contact is not limited to the back of the infant's head at its center. The peripheral area surrounding the back of the head is contacted by the padded rim 22 surrounding the fabric cover pocket 20 and by the material within the pocket 20. This creates a large area of contact that distributes contact forces and therefore reduces the likelihood of any contact injury from occurring. The large circle of contact also ensures that no forces are experienced by the infant's head that may result in cranial deformations and/or excess hair loss.

The relief 18 in the backrest 16 and the aligned pocket 20 of the fabric cover 12 are positioned a predetermined height above the seating unit 14. As will be explained, the backrest 16 is adjustable so that the position of the relief 18 and the pocket 20 relative the seating unit 14 can be selectively adjusted. This enables a person to adjust the position of the aligned relief 18 and pocket 20 so that they properly orient with the center of an infant's head. This alignment can therefore be maintained while the infant grows into a toddler. It also enables the infant seat assembly 10 to be used with infants of different sizes.

Two lateral head supports 24 are provided, wherein one lateral head support 24 is positioned on either side of the aligned relief 18 and pocket 20. The lateral head supports 24 can be manufactured as part of the backrest 16 or as part of the fabric cover 12. However, in the illustrated embodiment, the lateral head supports 24 are shown as separate parts that are mounted to the backrest 16. The backrest 16 includes slots 25 on either side of the relief 18. The slots 25 receive mounting bolts 27 that extend from the lateral head supports 24. This enables the lateral head supports 24 to be selectively positioned at different distances from the relief 16. A lateral head supports 24 can therefore be adjusted in position as an infant grows. Accordingly, the lateral head supports 24 help keep an infant's head medially aligned with the relief 18 in the backrest 16 by gently guiding the rear of the infant's head over the relief 18. The lateral head supports 24 prevent an infant from leaning his/her head at an angle that would prevent the infant's head from passing into the backrest relief 18 and the fabric cover pocket 20.

The seating unit 14 contains a seating surface 26. When an infant is placed in the infant seat assembly 10, the infant's bottom rests upon the seating surface 26 atop the fabric cover 12. A base 28 is provided below the seating surface 26. The base 28 is wide enough to support the infant seat assembly 10 upon any flat surface. Furthermore, the base 28 may contain strap connectors and/or strap slots 32 that enable the base 28 to be secured to a chair or similar elevated surface.

Auxiliary items, such as a food tray 31 or a play mobile (not shown) may be provided. The auxiliary items are attached to connectors 35 on the seating unit 14. The auxiliary items can be added or removed as needed.

Figure 3:
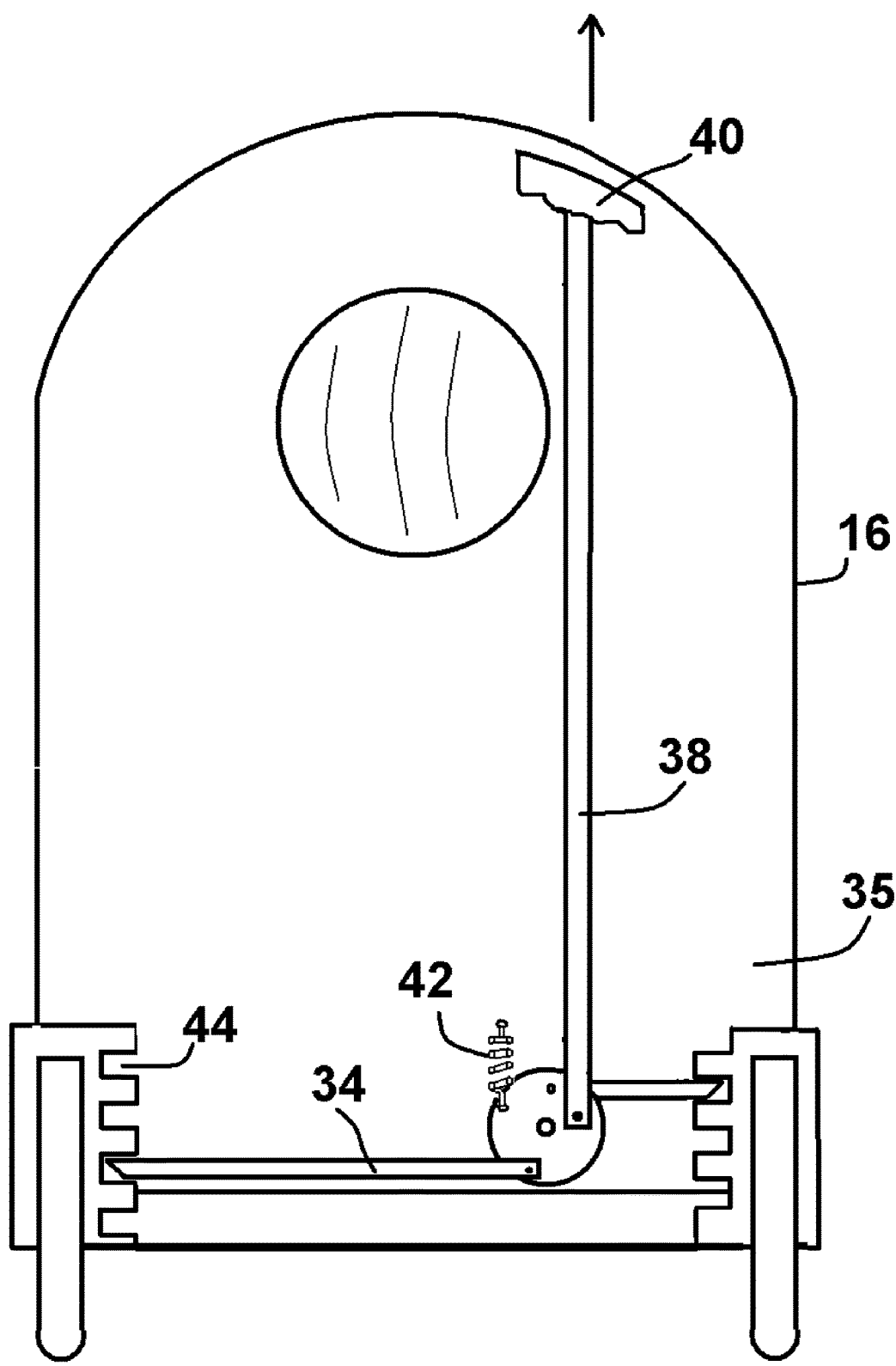
FIG. 3 is a cross-sectional view of the embodiment of FIG. 2 shown along section line 3-3 to illustrate the height adjustment mechanism for the backrest.

A backrest receptacle 30 is provided. The backrest receptacle 30 receives and engages the backrest 16 in a variety of vertical positions. In this manner, the height of the backrest relief 18 above the seating surface 26 can be selectively adjusted for infants of different heights. Referring to FIG. 3 in conjunction with FIG. 2, it can be seen that locking arms 34 are attached to the rear surface 35 of the backrest 16. The locking arms 34 are mounted in the horizontal plane and are eccentrically connected to a wheel 36. Accordingly, when the wheel 36 is rotated, the locking arms 34 can be selectively retracted or extended. An adjustment rod 38 is attached to the wheel 36. A handle 40 is affixed to the adjustment rod 38. When the handle 40 is pulled, the wheel 36 rotates and the locking arms 34 retract. Conversely, when the handle 40 is released, a spring 42 returns the adjustment rod 38 to its original position. This turns the wheel 36 and returns the locking arms 34 to their original extended positions.

The backrest receptacle 30 receives the backrest 16. The backrest receptacle 30 has a series of locking depressions 44 on either side of the backrest 16. The locking depressions 44 are at different distances from the below lying seating surface 26. Accordingly, by inserting the backrest 16 into the backrest receptacle 30 and engaging the locking depressions 44 with the locking arms 34, the backrest 16 can be locked at different heights within the backrest receptacle 30. The result is that the backrest 16 can be adjusted into different positions relative the seating surface 26. This enables the backrest relief 18 to be raised or lowered relative the seating surface 26.

The backrest receptacle 30 is connected to the seating unit 14 by two torsion springs 46. Each torsion spring 46 has a first arm 48 arm that is anchored to the backrest receptacle 30. Each of the torsion springs 46 also has an opposite second arm 50 that interconnects with the seating unit 14. As a result, the torsion springs 46 are the only elements that interconnect the backrest receptacle 30 with the seating unit 14. The backrest receptacle 30 holds the backrest 16. Accordingly, the backrest 16 and the backrest receptacle 30 can bounce against the spring bias of the torsion springs 46 relative the stationary seating unit 14.

Referring to FIG. 4 in conjunction with FIG. 2, it can be seen that each torsion spring 46 has a wound section 52, wherein the first arm 48 and the second arm 50 extend from the wound section 52. The first arm 48 is anchored within the backrest receptacle 30. The wound section 52 passes around a pivot post 54 that is formed as part of the seating unit 14. The second arm 50 of each torsion spring 46 extends into an inclination adjustment mechanism 56. Inside the inclination adjustment mechanism 56, there is an adjustment block 58. A spring loaded locking pin 60 extends rearwardly from the adjustment block 58. The spring loaded locking pin 60 can be retracted by manually moving a release lever 62. A locking pad 64 is affixed to the end of the second arm 50, wherein the locking pad 64 and the second arm 50 of each torsion spring 46 move in unison. The locking pad 64 contains a plurality of openings 66 that can be engaged by the locking pin 60. In this manner, it will be understood that the torsion spring 46 can be rotated about the pivot post 54 by moving the second arm 50 of the torsion spring 46 up or down in the direction indicated by arrow 68. At various positions, the second arm 50 can be locked in place by the locking pin 60.

The relative angle between the first arm 48 and the second arm 50 of each torsion spring 46 remains constant, provided the torsion spring 46 is not deformed by a force. This relative angle is preferably between 95 degrees and 120 degrees. As the wound section 52 of each torsion spring 46 rotates about the pivot post 54, the first arm 48 and the second arm 50 move together and the relative angle is maintained. As such, when the second arm 50 of the torsion spring 46 is moved up and down in the directions indicated by arrow 68, the relative angle between the first arm 48 and the second arm 50 remains the same. However, the angle of inclination A1 between the first arm 48 and the horizontal plane changes. The first arm 48 is anchored to the backrest receptacle 30. The backrest receptacle 30 receives and supports the backrest 16. As a result, it will be understood that the angle of inclination A1 for the backrest 16 depends upon the angle of the first arm 48 of the torsion spring 46. Accordingly, by adjusting the inclination adjustment mechanism 56, the angle of inclination A1 provided to the backrest 16 can be selectively changed. This enables a user to incline an infant from an upright position to an inclined position.

Since the backrest receptacle 30 and the backrest 16 are supported solely by the torsion springs 46, it will be understood that the backrest 16 and backrest receptacle 30 are free to bounce against the resistance of the torsion springs 46 regardless of the angle of inclination A1. The ability to bounce is therefore maintained in the upright position, the reclined position and at all positions there between.

Referring now to all figures, it will be understood that an infant is strapped into the infant support seat assembly 10 using the strapping 17 on the fabric cover 12. Once an infant is secured in place, the back of the infant's head should be resting over the pocket 20 in the fabric cover 12 and the underlying relief 18 in the backrest 16. If the infant's head does not align with the relief 18 and pocket 20, the backrest 16 can be adjusted in height to ensure proper head position.

With the infant in the infant seat assembly 10, the angle of inclination A1 for the backrest 16 can be selectively adjusted. Accordingly, the infant can be moved from an upright position to an inclined position. As the angle of inclination A1 changes for the backrest 16, the position of the infant's head on the backrest 16 may also change. It will be understood that a user can adjust the backrest 16 to ensure that the back of the infant's head rests upon the backrest opening 18, regardless of the angle of inclination A1. The result is an infant seat assembly 10 that performs as a bouncer, yet is adjustable from an upright position to an inclined position. Furthermore, regardless of the adjusted position, no contact occurs between the back center of the infant's head and any surface. As a result, issues of balding, contact soars and cranial deformations are greatly reduced.

It will be understood that the embodiment of the present invention that is illustrated and described is merely exemplary and that a person skilled in the art can make many variations to that embodiment. For instance, the shape of the seating unit and backrest can be altered as a matter of design. Likewise, many other mechanical adjustment designs other than those illustrated can be used to adjust the height of the backrest and/or the angle of inclination associated with the backrest. All such embodiments are intended to be included within the scope of the present invention as defined by the claims.

What is claimed is:

1. An infant seat assembly, comprising:
    a seating unit containing a seating surface upon which an infant can sit;
    a backrest connected to said seating unit, wherein said backrest defines a relief having a diameter of between three inches and six inches disposed therein, wherein said relief is positioned a predetermined distance from said seating surface;
    an adjustment mechanism for selectively adjusting said predetermined distance so that said relief is positioned to receive the head of an infant seated on said seating surface.

2. The assembly according to claim 1, further including torsion springs disposed between said backrest and said seating unit that enable said backrest to bounce relative said seating unit.

3. The assembly according to claim 1, wherein said backrest is oriented at an angle of inclination relative said seating surface.

4. The assembly according to claim 1, wherein said angle of inclination is manually adjustable.

5. The assembly according to claim 1, further including lateral head supports disposed on opposite sides of said relief, wherein said lateral head supports guide an infant's head against said relief when the infant is seated on said seating surface.

6. The assembly according to claim 1, further including a fabric cover that covers said backrest.

7. The assembly according to claim 6, wherein said fabric cover contains a pocket that aligns with said relief in said backrest.

8. The assembly according to claim 1, further including a backrest receptacle that receives said backrest, wherein said adjustment mechanism selectively alters the position of said backrest within said backrest receptacle.

9. The assembly according to claim 8, further including a torsion spring that interconnects said backrest receptacle to said seating unit.

10. The assembly according to claim 9, wherein said torsion spring has a first arm that connects to said backrest receptacle and a second arm that connects to said seating unit.

11. The assembly according to claim 10, wherein said torsion spring has a coiled section and said seating unit includes a pivot post around which said coiled section is free to rotate.

12. The assembly according to claim 10, wherein said second arm of each said torsion spring attaches to said seating unit in one of a plurality of adjustable positions.

13. An infant seat assembly, comprising:
    a seating unit containing a seating surface upon which an infant can sit;
    a backrest having a head relief formed therein, wherein said head relief has a diameter of between three inches and six inches;
    a backrest receptacle that selectively receives said backrest in one of a plurality of adjustable positions, wherein each of said plurality of adjustable positions places said head relief at a different distance from said seating surface; and at least one torsion spring having a first arm and a second arm, wherein said first arm is connected to said backrest receptacle and said second arm is connected to said seating unit.

14. The assembly according to claim 13, wherein said backrest is oriented at an angle of inclination relative said seating surface that is manually adjustable.

15. The assembly according to claim 13, wherein said relief has a diameter of between three inches and six inches, wherein said relief receives the head of an infant seated on said seating surface.

16. The assembly according to claim 15, further including a mechanism for selecting among said plurality of adjustable positions.

17. The assembly according to claim 13, wherein said second arm of said torsion spring attaches to said seating unit in one of a plurality of adjustable positions.

18. An infant seat assembly, comprising:
a seating unit containing a seating surface upon which an infant can sit;
a backrest that defines an opening having a diameter of between three inches and six inches, said backrest having retractable locking arms;
a handle supported by said backrest that retracts said retractable locking arms when pulled;
a backrest receptacle connected to said seating unit, said backrest receptacle having locking depressions at different distances from said seating surface, wherein said retractable locking arms selectively engage said locking depressions to attach said backrest to said backrest receptacle at one of multiple possible positions, wherein said opening is a different distance from said seating surface in each of said multiple possible positions.

19. The infant seat assembly according to claim 18, wherein said backrest is disposed at an angle of inclination relative said seating surface and said assembly further includes an adjustment mechanism for selectively adjusting said angle of inclination.

* * * * *